Jan. 12, 1960 W. TIRASPOLSKY 2,920,863
TURBINE FOR WELL DRILLING
Filed Aug. 2, 1957
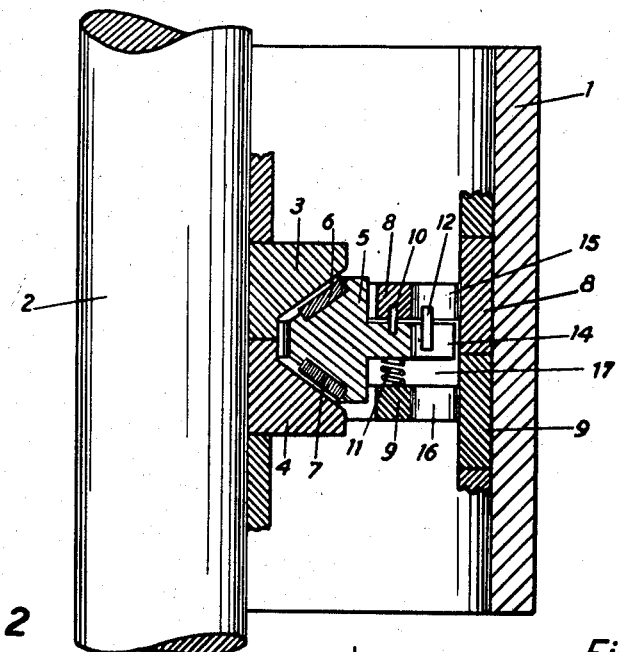
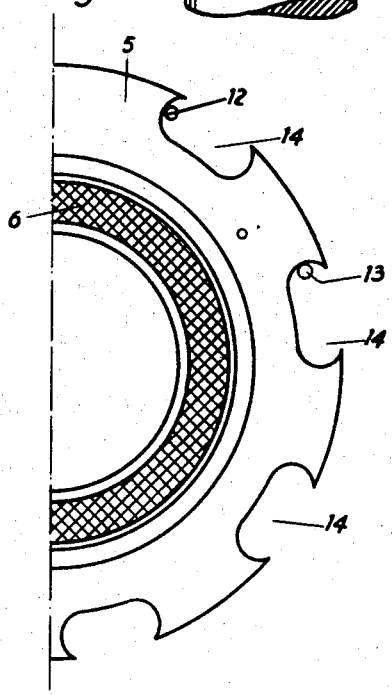
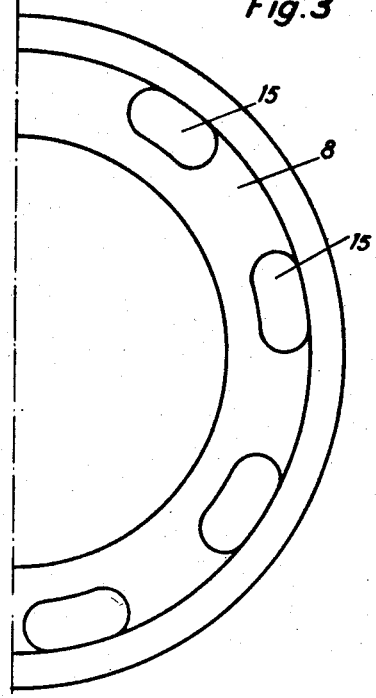

United States Patent Office 2,920,863
Patented Jan. 12, 1960

2,920,863

TURBINE FOR WELL DRILLING

Wladimir Tiraspolsky, Issy-les-Moulineaux, France

Application August 2, 1957, Serial No. 675,905

Claims priority, application France September 3, 1956

6 Claims. (Cl. 253—3)

The present invention relates generally to turbines used for well or similar drilling or sub-surface work, particularly for the exploitation of oil fields.

Actually a turbine for drilling work is a rotary motor driven by the speed and/or the drop of pressure of a stream of fluid injected into the system from the ground surface. This fluid which may or may not be charged is constituted either by a liquid or by a gas or by a mixture of liquid and gas.

Normally the turbine must be put out of service and subjected to an overhaul as soon as the wear of some parts, particularly the bearing surfaces of the thrust and bearing members reaches certain limits. This is also necessary when some parts of the turbine become burred, bruised or broken, when threads become loose or when some parts, some of which are stationary while others are movable, come into undue contact.

Operation of the turbine beyond such limit conditions would seriously damage the same or might even cripple the same to the verge of destruction. Numerous attempts have been made to stave off such an eventuality by maintaining a careful watch over the wear marks of the turbine. However this involves a waste of time due to the required manipulations and the need for skilled labor. This watch is not always effective because the measurements of wear may be altered due to the distortion of internal parts or to the loosening of some threads or joints such as the joints normally provided between the elements of double or multiple turbines. The usual practice as followed hitherto has been therefore, in order to assure avoidance of damage to send a worn out turbine to scrap even prematurely, which obviously increases service costs.

An object of the invention is to remedy the aforesaid disadvantages by the provision of an improved turbine capable of ensuring a maximum service duration while being protected against damage due to physical accidents.

Another object of the invention is to provide a new or improved turbine utilizable for well or similar drilling or sub-surface work and including means for throttling or closing off the feed ducts or channels for the power fluid responsive to the attainment of the limit wear marks in the turbine, thereby automatically stopping the operation of the turbine and preventing the same from being damaged.

A further object of the invention is to provide a turbine as aforesaid wherein total or partial closing of the passage for the power fluid is performed by the interposition of masking members, by the displacement of ported discs or sleeves or by the actuation of equivalent members.

A still further object of the invention is to provide a turbine as aforesaid in which the aforesaid means may be provided in a special joint connected to the turbine. This arrangement offers the advantage of saving the available vertical space inside the turbine and to avoid congestion of the free space for fluid flow, thereby lessening the loss of pressure head which may be caused by the provision of said means in normal service conditions. However this alternative arrangement is not compulsory and the throttling or closing off means may be of course accommodated in the turbine itself at any position deemed most advisable to suit practical requirements.

The provision of the throttling or closing off device for the power fluid permits its flow to be cut off or sufficiently reduced for bringing the amount of power torque to a magnitude less than the amount of the resistant torque, which brings the turbine to a standstill, while at the same time the operator who works on the ground surface is apprized of the operation of said device when seeing a sudden and abnormal rise of the forcing pressure of the pumps. Said operator is thus incited to stop the feed of the power fluid and to bring out the tool to the ground surface.

Generally speaking, the aforesaid means may be so provided as to produce a partial closing off which is sufficient as a rule and permits the danger of fluid hammering or the damage of ground equipment to be avoided following too swift a rise of pressure. This part closing of the feed of power fluid is sufficient for permitting the fluid in circulation to flow according to a limited rate during the lifting of the tools or where an accident is caused as the turbine is brought to a standstill.

According to a constructional embodiment of the invention which seems to be particularly advantageous, members associated with the turbine rotor shaft or provided thereon are adapted, when the wear mark is reached, to come into cooperation, for example by friction or by intermeshing with parts which are then positively driven, means associated with said parts then partly or wholly closing off the power fluid feed ducts or channels. Said members may include for example a ring member fixed to the turbine body or casing or an equivalent part and having at least one circular row of ports normally coinciding with companion ports provided in a throttling disc connected with said ring member by frangible pins, cotters or like parts, whereby the cooperation is achieved between said throttling disc and the turbine rotor shaft, when the limit wear mark is reached, thus imparting a rotation to said disc owing to said pins or cotters being then shorn off, so that an offsetting of said ports is obtained and they cease to register with one another, thus partly or wholly closing off the flow of fluid.

With the aforesaid objects and such other objects in view as will incidentally appear hereafter, the invention comprises the novel construction and combination of parts as will now be described with reference to the accompanying diagrammatic drawing exemplifying the same and forming a part of the present disclosure.

In the drawing:

Fig. 1 is a diagrammatic half sectional vertical view of a portion of a well-drilling turbine incorporating a device for throttling the feed of power fluid according to the invention.

Figs. 2 and 3 are horizontal half plan views showing respectively the throttling disc and the stationary ring member in plan view.

In the showing of Fig. 1 is diagrammatically illustrated a turbine body or casing 1 through which a turbine rotor shaft 2 extends vertically. The rotor shaft of this turbine has a pair of frustoconical parts 3, 4 which encompass a throttling disc 5 provided with braking or intermeshing surfaces 6, 7. The disc 5 is interposed between ring members 8, 9 secured in any approved way to the turbine body 1, and is connected to the ring member 8 by frangible pins 10 subjected to shearing stresses. The disc 5 is urged toward said ring member 8 by helical springs 11 interposed between the face of the disc 5 remote from the ring member 8 and the adjacent face of the ring member 9. On the disc 5 are provided studs 12, 13 (Fig. 2) which restrict its angular motion with respect to the ring member 8 as indicated hereinafter.

The disc 5 is formed adjacent its periphery with a circular row of ports 14 which normally coincide with ports 15 formed adjacent the periphery of the ring member 8.

Other ports 16 are also provided in the lower ring member 9.

As shown in Fig. 1, the active faces 6, 7 of the stator disc 5 are separated from the confronting faces on the rotor parts 3, 4 by a slight gap the axial length of which corresponds to the permissible wear limit for the bearing faces of the thrust and bearing members of the turbine.

The operation of the fluid-throttling or closing off device as aforesaid is as follows: As the limit wear mark for the turbine parts is reached in the one or the other direction, either the part 3 or the part 4 comes into cooperation with the neighboring friction or engagement face 6 or 7 of the throttling disc 5. As a result of this, a positive angular motion is imparted to said disc, thereby shearing off the pins 10. The angular stroke of the disc 5 is limited by the studs 12, 13. When the disc 5 has assumed a further position, the ports 15 in the ring member 8 no longer coincide with the ports 14 in the disc, so that the annular passage for the flow of the circulating fluid is closed off at least partly while the space 17 permits a constant communication between the disc ports 14 and the ports 16 in the lower ring member 9. This closing off action of the fluid passage involves a sudden increase of the forcing pressure exerted by the pumps located on the ground, so that the operator in charge of the plant is warned of the attainment of the wear mark and may consequently actuate the lifting mechanism to bring up the tools to ground surface. Said closing off action also brings the turbine to a standstill which prevents it from becoming damaged.

Modifications may be introduced without departing from the scope of the invention.

What is claimed is:

1. In a fluid driven turbine utilizable for well or similar drilling or sub-surface work having a casing and a rotor shaft rotatably mounted therewithin, means forming a channel for the flow of fluid to drive the turbine, a part angularly rigid with the casing and interposed in said channel and provided with port means for the flow of the fluid, a throttling member angularly movable with respect to said part from a first position with said port means open to a second position with said port means at least partially closed, means normally holding said member in said first position, and means operated by said rotor shaft and engageable with said throttling member for rendering said throttling member angularly rigid with said shaft upon predetermined axial displacement of the rotor shaft relative to the casing so as to cause an angular movement of said member with respect to said part and for throttling said port means and reducing the power of the turbine.

2. In a fluid driven turbine utilizable for well or similar drilling or sub-surface work having a casing and rotor shaft rotatably mounted therewithin, means forming a channel for the flow of the fluid to drive the turbine, a part connected to the casing, said part being interposed in said channel and provided with port means for the flow of the fluid, a throttling member angularly movable with respect to said part from a first position with said port means open to a second position with said port means at least partially closed, means normally holding said member in said first position, a primary driving surface carried by said throttling member, an element angularly rigid with the rotor shaft of the turbine and a second drive surface carried by said element, said primary and secondary surfaces being normally spaced from each other by an axial distance, axial displacement of the rotor shaft relative to the casing through said axial distance upon wear of the turbine in use engaging said primary and secondary surfaces to drive said throttling member for reducing the power of the turbine.

3. In a fluid driven turbine for well or similar drilling or for sub-surface work having a casing and a rotor shaft rotatably mounted therewithin, means forming a channel for the flow of the fluid to drive the turbine, a part connected to the casing, said part being interposed in said channel and having fluid flow ports, a throttling member angularly movable with respect to said part from a first position with said ports open to a second position with said ports at least partially closed, means normally holding said member in said first position, a primary set of friction surfaces of conical outline on said throttling member, means connected to the rotor shaft of the turbine having a secondary set of friction surfaces thereon, the surfaces of said primary and secondary sets being oppositely located and normally spaced by an axial distance, axial displacement of the rotor shaft relative to the casing through said axial distance upon wear of the turbine in use engaging one of each of said primary and secondary sets of friction surfaces to drive the throttling member and reduce the power of the turbine.

4. A turbine according to claim 3, wherein the friction surfaces of the primary and secondary sets are respectively directed in opposite directions so as to be operative in the two directions of axial wear of the turbine.

5. In a fluid driven turbine utilizable for well or similar drilling or sub-surface work having a casing and a rotor shaft rotatably mounted therewithin, means forming a channel for the flow of the power fluid to drive the turbine, a ring member connected to the casing, said ring member being interposed in said channel and having ports for the flow of the fluid, a throttling disc having flow ports, said disc being angularly movable with respect to said ring member, means normally holding said ports in the ring member and disc in registration, driving surfaces on the disc, members connected to the rotor shaft of the turbine for movement therewith, driving surfaces on said members, said surfaces being normally spaced from the disc surfaces by an axial distance, axial displacement of the rotor shaft relative to the casing through said axial distance upon wear of the turbine in use engaging driving surfaces on said disc and members to shift the throttling disc relative to said ring member, and abutments for limiting the angular motion of the disc with respect to said ring member to a position in which said disc ports and ring member ports are no longer in coincidence.

6. In a fluid driven turbine for well or similar drilling or sub-surface work having a casing and a rotor shaft rotatably mounted therewithin, means forming a channel for the flow of the power fluid to drive the rotor, a primary ring member connected to said casing, said ring member being interposed in the channel and having ports for the flow of the fluid, a secondary ring member connected to the casing, said secondary ring member being axially spaced from the primary ring member and also having ports for fluid flow, a throttling disc having ports and interposed between the primary ring member and secondary ring member and being axially movable with respect to them, means normally holding said ports in the ring member and the disc in coincidence, elastic means interposed between said disc and said secondary ring member for applying the disc against the primary ring member, a primary set of friction surfaces carried by said disc, a secondary set of friction surfaces connected to the rotor of the turbine and being normally spaced from the surfaces on the primary set of friction surfaces by an axial distance, axial displacement of the rotor shaft relative to the casing through said axial distance upon wear of the turbine in use engaging friction surfaces on said disc and shaft to shift the throttling disc between said ring members, and stops limiting the angular displacement of the disc to a position wherein the disc ports and the ring member ports are no longer in coincidence.

References Cited in the file of this patent

UNITED STATES PATENTS

| | | |
|---|---|---|
| 2,459,519 | Graham et al. | Jan. 18, 1949 |
| 2,569,898 | Millns | Oct. 2, 1951 |
| 2,651,493 | Volk | Sept. 8, 1953 |
| 2,825,531 | Holt | Mar. 4, 1958 |